United States Patent
Körber et al.

[11] Patent Number: 6,003,927
[45] Date of Patent: Dec. 21, 1999

[54] CENTER CONSOLE HAVING LENGTHWISE, LATERALLY AND VERTICALLY MOVEABLE ARMREST FOR AN AUTOMOBILE

[75] Inventors: Jürgen Körber, Sindelfingen; Bernd Schenk, Horb; Thomas Schmid, Ehningen, all of Germany

[73] Assignee: Mercedes-Benz AG, Germany

[21] Appl. No.: 08/828,292

[22] Filed: Mar. 21, 1997

[30] Foreign Application Priority Data

Mar. 26, 1996 [DE] Germany .................. 196 11 892

[51] Int. Cl.$^6$ ........................................ B60N 3/00
[52] U.S. Cl. ........................................... 296/37.8
[58] Field of Search ................ 296/37.8, 37.14, 296/37.15; 297/188.14, 188.19, 411.35, 411.36, 411.37

[56] References Cited

FOREIGN PATENT DOCUMENTS

| 2633566 | 1/1990 | France . |
|---|---|---|
| 3807880 | 9/1989 | Germany . |
| 4135279 | 4/1993 | Germany . |

*Primary Examiner*—Andrew C. Pike
*Attorney, Agent, or Firm*—Evenson, McKeown, Edwards & Lenahan, P.L.L.C.

[57] ABSTRACT

An automobile center console has an associated armrest with a lifting and transverse shifting mechanism that exerts on the armrest a combination of a lifting movement and a transverse displacement toward one of the two front seats. The lifting and transverse shifting mechanism is located on a guide carriage that is linearly movable by a linear guide device along the center console in the lengthwise direction of the vehicle.

17 Claims, 5 Drawing Sheets

CENTER CONSOLE HAVING LENGTHWISE, LATERALLY AND VERTICALLY MOVEABLE ARMREST FOR AN AUTOMOBILE

BACKGROUND AND SUMMARY OF THE INVENTION

The invention relates to a center console for an automobile, said console being located between the two front seats, with at least one armrest associated with at leas one of the two front seats, said armrest being adjustable by means of at least one adjusting device into different ergonomic positions relative to the (at least) one front seat.

Adjustable armrests for motor vehicles are known from German Patent Document DE 38 07 880 C2. Such known armrests are mounted to be displaceable along the center console of the interior of the vehicle, with adjustment relative to the position of the front seats from the ergonomic standpoint being possible depending on the position of the respective front seat.

A height-adjustable center armrest for motor vehicles is known from French Patent 2 633 566 in which the armrest plate is mounted on a supporting plate by a plurality of compression springs as well as a lifting mechanism. The supporting plate together with the armrest is mounted on an adjustable frame and is intended merely to be placed loosely in the vicinity of the center console of the vehicle. The lifting mechanism comprises a spider that is lockable by engaging a locking rod, said spider supporting the armrest and being adjustable heightwise manually exclusively in the vertical direction, with extension being reinforced by releasing the compression springs and lowering being accomplished against the force of the compression springs.

An ergonomically adjustable armrest is also known from German Patent Document DE 41 35 279 A1, said armrest being mountable by a vertical base plate on doors or side walls of a motor vehicle. Heightwise and widthwise adjustment is permitted by two linear guides and corresponding gear drives using an external drive. No lengthwise displaceability is provided.

An object of the invention is to provide a center console of the type referred to at the outset whose armrest is adaptable in an ergonomically satisfactory manner to a wide range of individuals of extremely different heights.

This object is achieved according to preferred embodiments of the invention by virtue of the fact that the armrest has associated with it a lifting and transverse shifting mechanism that exerts on the armrest a combination of a lifting movement and a transverse shift, crosswise with respect to the lengthwise axis of the vehicle, toward one of the two front seats and in that the lifting/shifting mechanism is mounted on a guide carriage that is linearly movable in the lengthwise direction of the vehicle by means of a linear guide device along the center console. In addition to the lengthwise displacement of the armrest, known of itself, the armrest can therefore be adjusted heightwise and transversely toward the respective front seat, so that the armrest can be adjusted in an ergonomically favorable manner for a wide range of individuals ranging from very small, thin individuals to very tall, broad persons. The transverse shift toward the front seat makes it unnecessary for relatively short, thin persons to slide sideways on their front seats in order to be able to support themselves on the armrest.

In the design of certain preferred embodiments of the invention, a scissors joint is provided as the lifting and transverse shifting mechanism, one of whose joint levers is additionally displaceable transversely in the vicinity of its upper and lower articulation points in a linear guide. This is an especially simple yet functionally reliable mechanical solution for the lifting and transverse shifting mechanism.

In certain preferred embodiments of the invention, the scissors joint is lockable in its folded and extended end positions as well as in several intermediate positions with the aid of a lock. In this way, any person seated on the corresponding front seat can move the armrest individually into the correct ergonomic position and lock it in this position.

In certain preferred embodiments of the invention, the lock is manually operable by a handle. This is a simple and economical yet functionally reliable design.

In certain preferred embodiments of the invention, the linear guide device is a locking mechanism for locking the guide carriage in different intermediate positions between front and rear end positions as well as for locking in the two end positions. The armrest is also lockable along the center console in various individually adjustable positions.

In certain preferred embodiments of the invention, the locking device is manually operable by a handle. This also results in simple and economical yet functionally reliable operability for the locking device.

Other objects, advantages, and novel features of the present invention will become apparent from the following detailed description of the invention when considered in conjunction with the accompanying drawings.

DETAILED DESCRIPTION OF THE DRAWINGS

Figure 5:
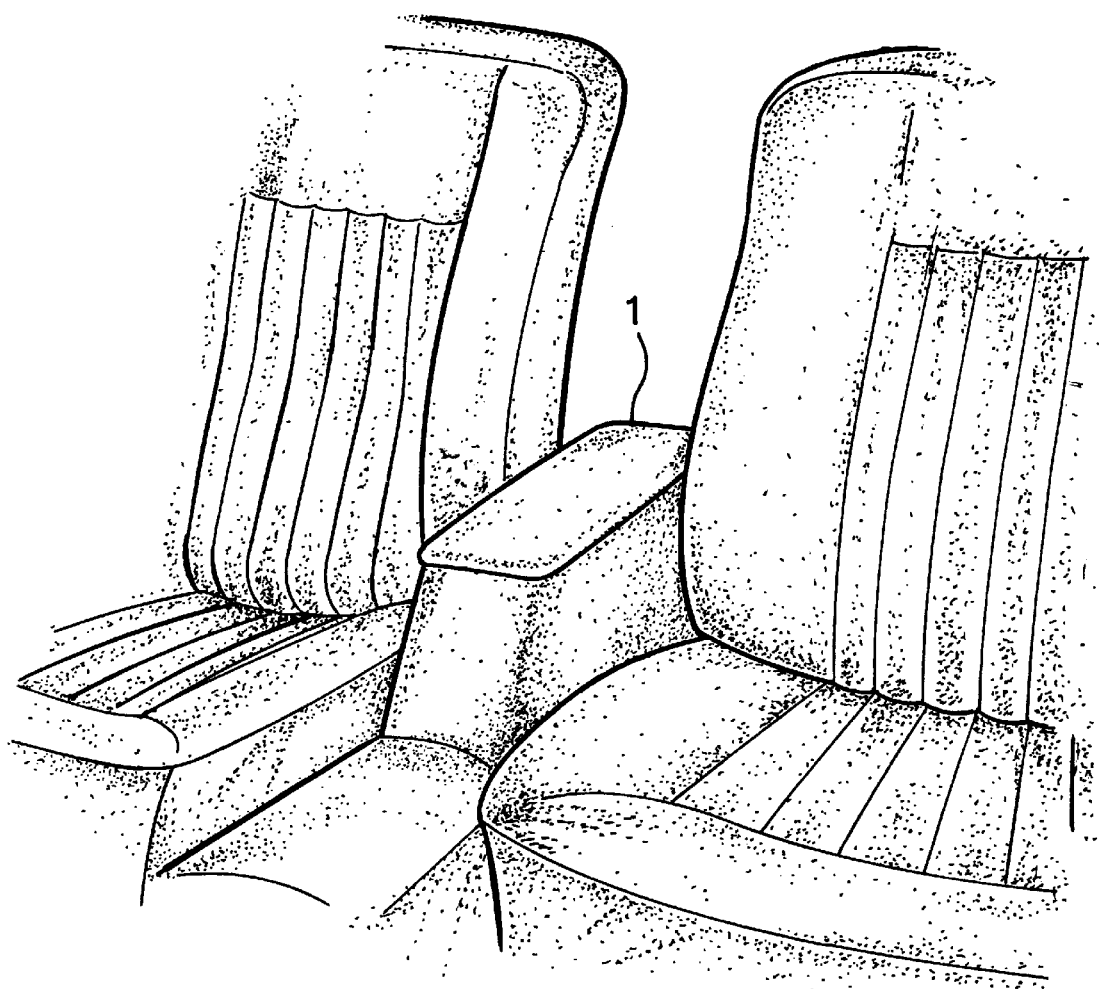
FIG. 5 is a view of the automobile cockpit illustrating the position of the center console.

A center console (1), shown only schematically in FIG. 5, extends rearward in a manner known of itself from a cockpit in the interior of a motor vehicle, lengthwise of the vehicle, said console being flanked on both sides by two front seats. The two front seats, namely a driver's seat and a passenger seat, are mounted lengthwise displaceably on the vehicle floor. A storage compartment (2) is provided in center console (1) approximately at the level of the seat backs of the front seats. Storage compartment (2) is closable by a lid (4) which is pivotably mounted at its rear end (14) relative to the normal direction of travel of the automobile. At its forward end, lid (4) is lockable in its closed position by a magnetic lock (13).

Figure 1:
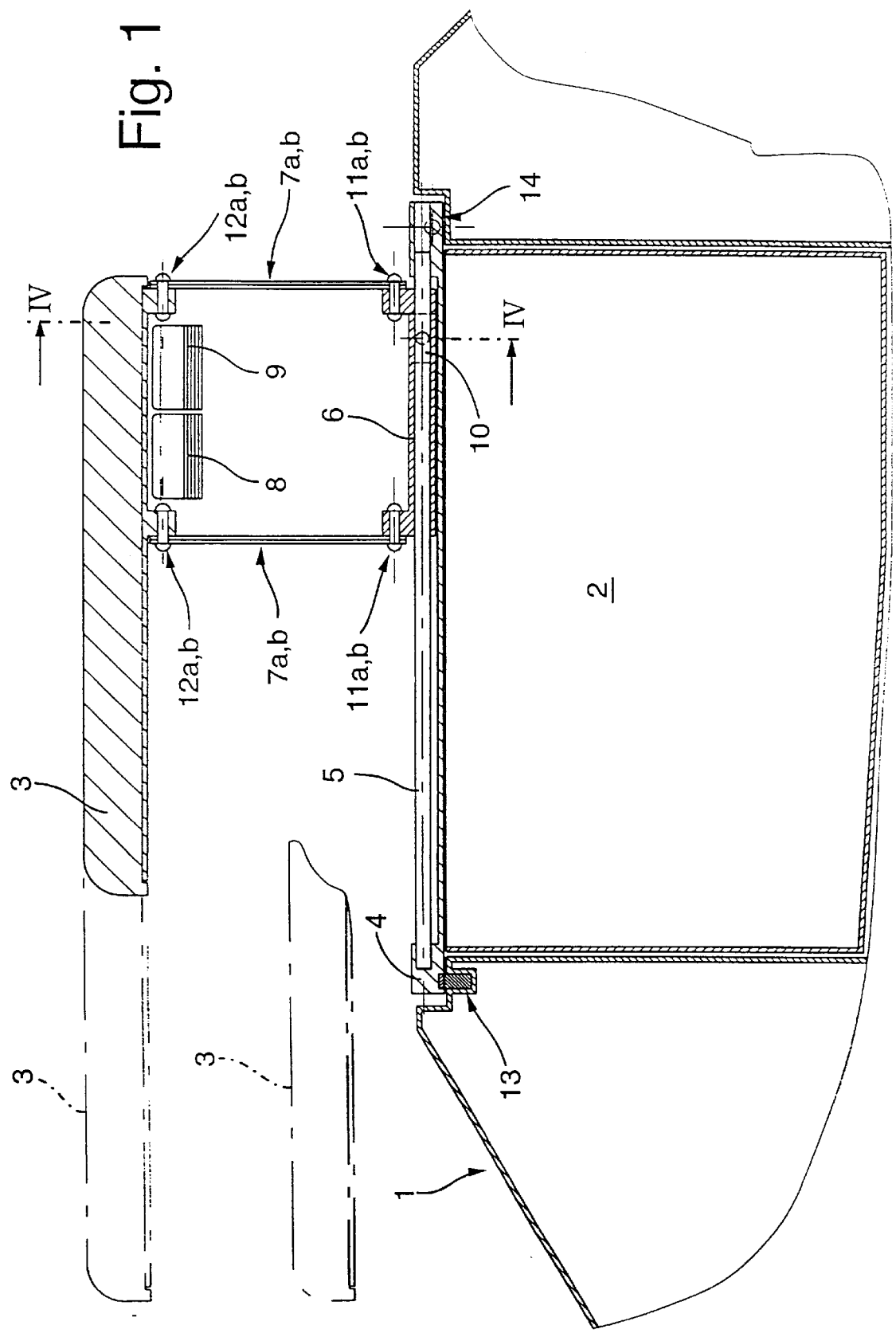
FIG. 1 is a lengthwise sectional view through one embodiment of a center console in the vicinity of an adjustable armrest constructed according to a preferred embodiment of the invention.
Figure 2:
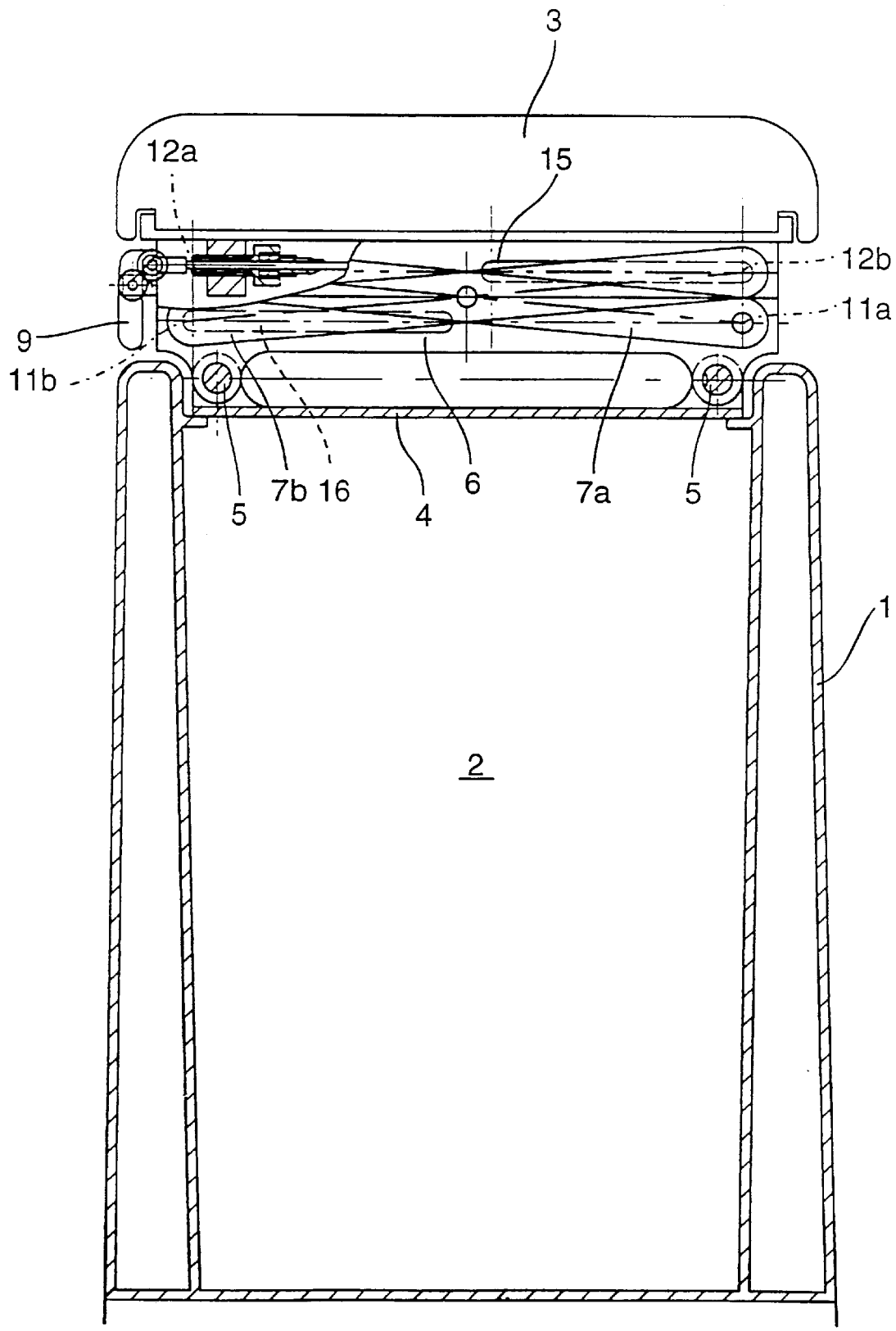
FIG. 2 is a cross-sectional view through the center console according to FIG. 1 provided with the armrest, showing the armrest in a lowered end position.
Figure 3:
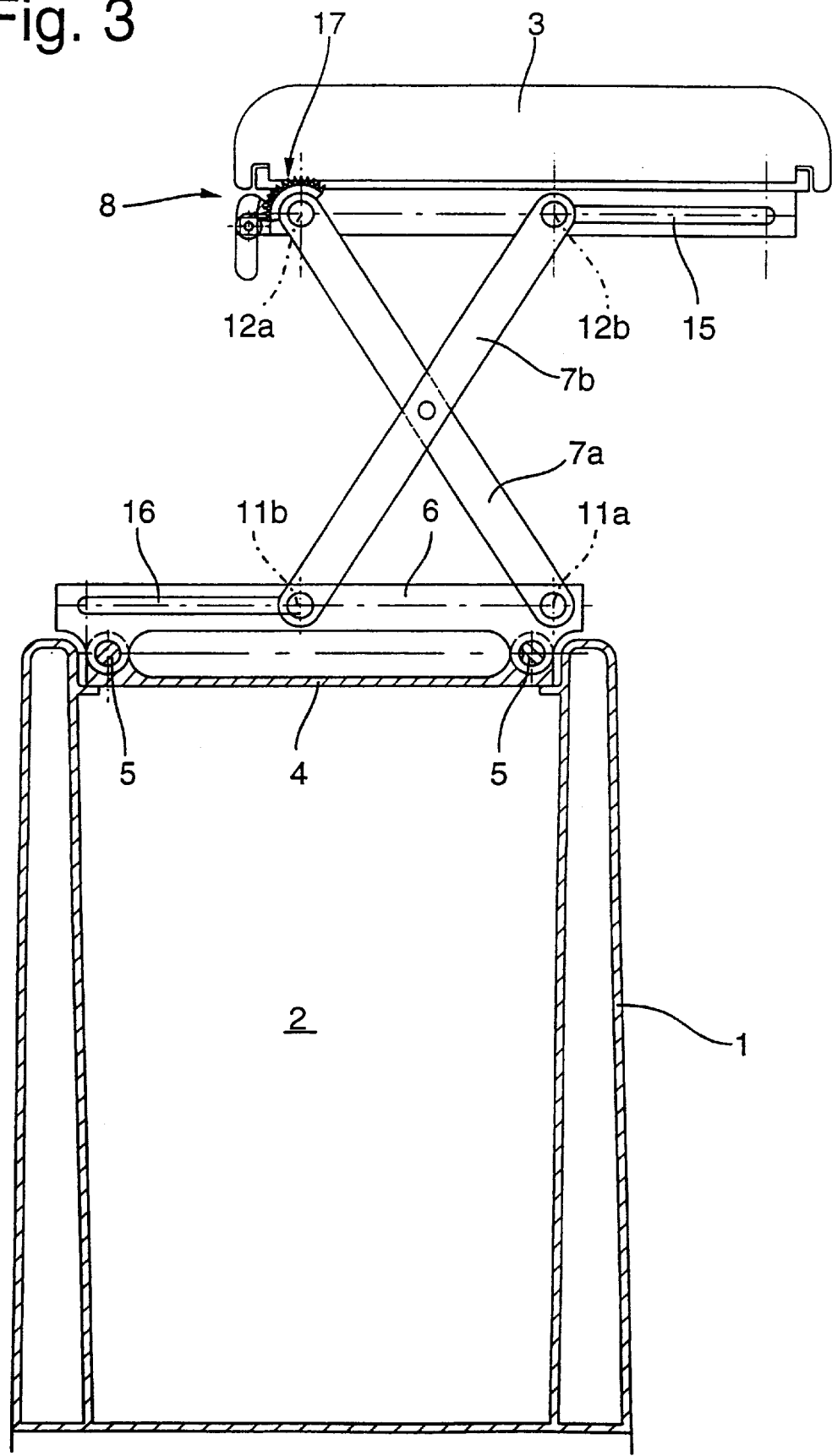
FIG. 3 is a cross-sectional view through the center console according to FIG. 2 provided with the armrest, with the armrest however being in an upper end position and displaced transversely sideways.
Figure 4:
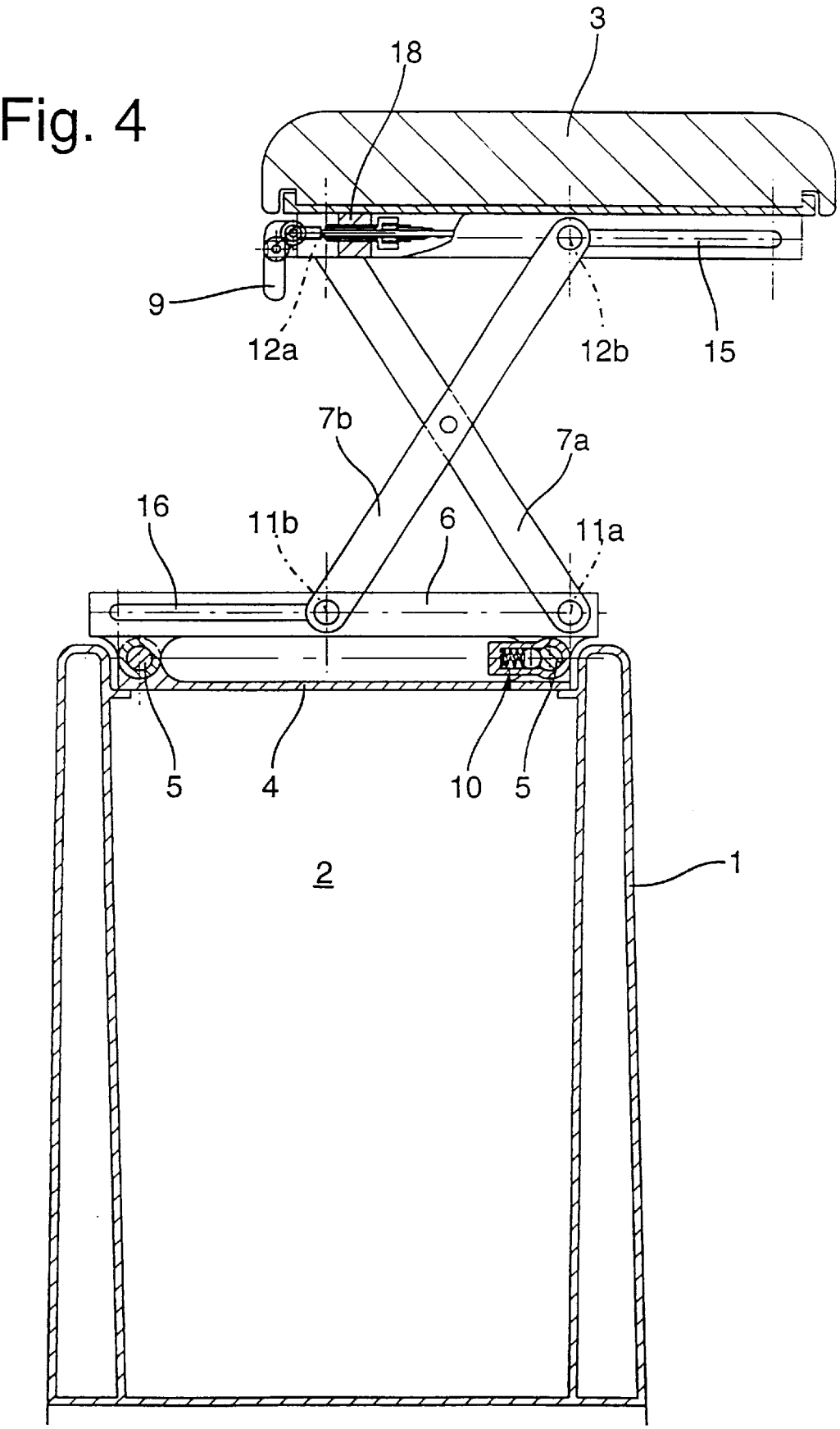
FIG. 4 shows a cross section similar to FIG. 3 but along line IV—IV in FIG. 1.

Lid (4) also serves to mount an adjustable armrest (3) held on one side on a guide carriage (6), said carriage being linearly movable along a linear guide in the form of two parallel guide rods (5) along center console (1) and therefore along a lengthwise axis of the vehicle. In addition armrest (3) is adjustable heightwise by means of a lifting and transverse shifting mechanism (7a, 7b, 11a, 11b, 12a, 12b, 15, 16) described in greater detail below, and, with this heightwise adjustment, additionally movable transversely toward one of the two front seats, namely the driver's seat (FIGS. 3 and 4). The dot-dashed outline of armrest (3) in FIG. 1 shows the forward end position of armrest (3) that is limited by an end stop on linear guide (5). Armrest (3) is therefore movably mounted along all three coordinate axes of the vehicle interior (length, height, width) and can thus be adjusted individually to a wide range of individuals of different heights and widths, with armrest (3) being adjusted in a correspondingly ergonomically suitable fashion. Armrest (3) described with reference to FIGS. 1 to 4 is especially designed for association with the driver's seat, in that the lifting and transverse shifting mechanism shifts armrest (3) sideways toward the driver's seat. Similarly, the armrest can also be adjusted with respect to the passenger seat, according to another embodiment according to the invention. For this purpose the lifting and transverse shifting mechanism is simply reversed accordingly.

For linear guidance of armrest (3), guide carriage (6) is secured slideably movably on two guide rods (5), with both guide rods (5) having their ends in the end blocks of lid (4) and secured there. One of the two guide rods (5), in the embodiment shown the guide rod (5) facing the driver's seat, has a locking device (10) associated with it for stepwise locking of armrest (3) in different intermediate positions. For this purpose, guide rod (5) is provided with a series of holes along its length that a spring-loaded locking ball of locking device 10 can engage. Locking device 10 is mounted in guide carriage (6) and is releasable or lockable from armrest (3). For this purpose, a handle (9) is provided on the side of armrest (3) that faces the passenger seat, said handle transmitting corresponding locking or unlocking movements to locking device (10) by means of a Bowden cable (18). The path of the Bowden cable (18) is not shown in the figures.

The lifting and transverse shifting mechanism has a scissors joint (7a, 7b) (FIGS. 2 to 4) with the two joint levers (7a and 7b) of the scissors joint having the same dimensions. Of course, the lifting and transverse shifting mechanism has a total of four joint levers (7a, 7b), since the scissors joint for lifting and transverse shifting of armrest (3) consists of two pairs of joint levers (7a, 7b) spaced apart from one another along center console (1). The functional principle of the lifting and transverse shifting mechanism however will be described below with reference to only one joint lever pair (7a, 7b). The other joint lever pair is designed and mounted identically.

Joint lever (7a) is pivotably movably mounted by means of a hinge pin (11a) at its lower end to guide carriage (6) and is likewise mounted pivotably movably at its upper end by means of an additional hinge pin (12a) on a bearing block of armrest (3) not described in further detail. The pivot axes of hinge pins (11a and 12a) run parallel to one another and in the lengthwise direction of the vehicle and therefore parallel to the lengthwise axis of center console (1). The other joint lever (7b) is likewise connected with the aid of two hinge pins (11b and 12b) at its opposite ends with guide carriage (6) on the one hand and the bearing block of armrest (3) on the other. However, the two hinge pins (11b and 12b) are slidably movably mounted in a linear slot guide (15, 16), with joint lever (7b) additionally being pivotable around hinge pins (11b and 12b). The two slot guides (15 and 16) in the bearing block of the armrest on the one hand and the guide carriage (6) on the other run parallel to one another horizontally, and transversely with respect to the lengthwise axis of center console (1). As a result of these slot guides (15, 16) located in the bearing block of armrest (3) on the one hand and in guide carriage (6) on the other, armrest (3), when lifted from its resting position (FIG. 2) into a raised functional position, is additionally shifted sideways toward the driver's seat, with the maximum transverse displacement toward the driver's seat being limited by the length of slot guides (15 and 16).

FIGS. 3 and 4 show the upper end transversely displaced in positions of armrest (3). The sliding guidance of hinge pins (11b, 12b) in slot guides (15 and 16) is designed to be self-locking so that armrest (3) remains in a corresponding intermediate position in which it is only partially displaced heightwise and transversely as soon as armrest (3) is locked in this intermediate position. Locking is provided by a latch (8, 17) that has a preferably one-piece toothed latch (17) permanently attached to the upper end of joint lever (7a), which latch (17) a spring-loaded pawl of another handle (8) engages. Handle (8) is located next to handle (9) for Bowden cable (18) and serves for manually releasing and locking the latch that locks or releases the lifting and transverse shifting mechanism. Toothed latch (17) has a plurality of teeth each of which defines an intermediate position for armrest (3), so that armrest (3), in addition to its lower resting position (FIG. 2) and its upper end position (FIGS. 3 and 4), can also be lockable in a plurality of intermediate positions between these two end positions.

Because of the adjustability of armrest (3) according to the invention, it is therefore possible to adapt the position of armrest (3) to the position of the driver's seat by simply shifting armrest (3) lengthwise. In addition, armrest (3) can be adjusted heightwise by the lifting and transverse shifting mechanism and partially displaced sideways until it is above the seat contour of the driver's seat, so that even small, thin persons who only partially fill the driver's seat can support their elbows comfortably without having to move far to the side. When armrest (3) is in its lower resting position, it is suitable for very tall and very broad persons. Of course the scissors joint is made sufficiently stable that in any event it provides reliable support for an elbow or lower arm of any person who belongs to the group of persons suitable for the invention, without yielding.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Center console for an automobile, located between two front seats, comprising a linear guide device extending in a lengthwise direction of the automobile, at least one armrest associated with at least one of the two front seats, and at least one adjusting device mounting said armrest on said linear guide device for ergonomically adjusting said armrest relative to the front seats, wherein said adjusting device comprises a guide carriage linearly moveable on said linear guide device along the lengthwise direction of the automobile, and a lifting and transverse shifting mechanism mounted on said guide carriage that exerts a combination of a lifting movement and a transverse displacement on the armrest, sideways with respect to the lengthwise direction of the automobile and toward either of the two front seats.

2. Center console according to claim 1, wherein the lifting and transverse shifting mechanism comprises a scissors joint and a linear guide, one joint lever of said joint being additionally displaceable transversely in a vicinity of upper and lower articulation points thereof in said linear guide.

3. Center console according to claim 2, further comprising a latch for locking the scissors joint in folded and extended end positions as well as in a plurality of intermediate positions.

4. Center console according to claim 3 further comprising a handle for manually operating the latch.

5. Center console according to claim 1, wherein the linear guide device includes a locking device for locking the guide carriage in one of two end positions or in intermediate positions between the end positions.

6. Center console according to claim 5 further comprising a handle for manually operating the locking device.

7. Console assembly disposable adjacent a vehicle seat, the console assembly comprising:
   a console housing,
   an armrest, and
   an armrest support arrangement connecting the armrest to the console housing,
   wherein said armrest support arrangement includes:
      a guide carriage movable along the console housing and facilitating movement of said armrest in a lengthwise direction of the console housing, and
      a lifting and transverse displacement mechanism carried by the carriage and facilitating vertical and transverse adjustment of the armrest.

8. Console assembly according to claim 7, wherein the lifting and transverse displacement mechanism comprises a scissors joint and a linear guide, one joint lever of said joint being additionally displaceable transversely in a vicinity of upper and lower articulation points thereof in said linear guide.

9. Console assembly according to claim 8, further comprising a latch for locking the scissors joint in folded and extended end positions as well as in a plurality of intermediate positions.

10. Console assembly according to claim 9, further comprising a handle for manually operating the latch.

11. Console assembly according to claim 10, wherein the guide carriage includes a linear guide device comprising a locking device for locking the guide carriage in one of two end positions or in intermediate positions between the end positions.

12. Console assembly according to claim 11, further comprising a handle for manually operating the locking device.

13. Console assembly according to claim 7, wherein the guide carriage includes a linear guide device comprising a locking device for locking the guide carriage in one of two end positions or in intermediate positions between the end positions.

14. Console assembly according to claim 7, wherein said console assembly is a center console with said console housing disposable in use between two front seats of a passenger car.

15. Console assembly according to claim 14, wherein the lifting and transverse displacement mechanism comprises a scissors joint and linear guide, one joint lever of said joint being additionally displaceable transversely in a vicinity of upper and lower articulation points thereof in said linear guide.

16. Console assembly disposable adjacent a vehicle seat, the console assembly comprising:
   console housing means defining a storage space and an upper lid, and
   an armrest support arrangement mounted on said upper lid,
   said armrest support arrangement including:
   an armrest,
   a movable linear guide means for accommodating selective linear movement of said armrest in a lengthwise direction of said console housing means, and
   a lifting and transverse displacement means carried by the linear guide means accommodating vertical and transverse adjusting movement of the armrest.

17. Console assembly according to claim 16, wherein the lifting and transverse displacement means comprises a scissors joint and a linear guide, one joint lever of said joint being additionally displaceable transversely in a vicinity of upper and lower articulation points thereof in said linear guide.

* * * * *